United States Patent
Zhang et al.

(10) Patent No.: US 10,457,294 B1
(45) Date of Patent: Oct. 29, 2019

(54) NEURAL NETWORK BASED SAFETY MONITORING SYSTEM FOR AUTONOMOUS VEHICLES

(71) Applicant: Baidu USA LLC, Sunnyvale, CA (US)

(72) Inventors: Liangliang Zhang, San Jose, CA (US); Guang Yang, Sunnyvale, CA (US); Jingtao Hu, Sunnyvale, CA (US); Dong Li, Sunnyvale, CA (US); Jinghao Miao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/021,007

(22) Filed: Jun. 27, 2018

(51) Int. Cl.
| | |
|---|---|
| *B60Q 1/00* | (2006.01) |
| *B60W 50/14* | (2012.01) |
| *G05D 1/00* | (2006.01) |
| *G06N 5/04* | (2006.01) |
| *G06F 16/29* | (2019.01) |
| *G06N 3/02* | (2006.01) |

(52) U.S. Cl.
CPC ........... *B60W 50/14* (2013.01); *G05D 1/0061* (2013.01); *G05D 1/0088* (2013.01); *G06F 16/29* (2019.01); *G06N 5/046* (2013.01); *B60W 2050/143* (2013.01); *B60W 2420/42* (2013.01); *B60W 2420/52* (2013.01); *G05D 2201/0213* (2013.01); *G06N 3/02* (2013.01)

(58) Field of Classification Search
CPC ...... G08G 1/166; G08G 1/167; G06T 19/006; B60W 50/14
USPC .................. 340/425.5, 426.24, 435, 436, 438
See application file for complete search history.

(56) References Cited

U.S. PATENT DOCUMENTS

| | | | |
|---|---|---|---|
| 10,007,269 B1 * | 6/2018 | Gray | ...................... G05D 1/0248 |
| 10,083,547 B1 * | 9/2018 | Tomatsu | ................ B60K 35/00 |
| 2018/0074501 A1 * | 3/2018 | Boniske | ................ B60W 50/00 |
| 2018/0141544 A1 * | 5/2018 | Xiao | ...................... G01S 13/862 |
| 2018/0374359 A1 * | 12/2018 | Li | ...................... G06K 9/00805 |

\* cited by examiner

*Primary Examiner* — Toan N Pham
(74) *Attorney, Agent, or Firm* — Womble Bond Dickinson (US) LLP

(57) ABSTRACT

According to one embodiment, a system receives sensor data from a number of sensors of the ADV. The system extracts a predetermined number of features from the sensor data using a machine learning model. The system determining whether to alert a user to intervene the ADS based on the extracted features using the machine learning model. The system then generating a safety alarm based on the determining whether to alert the user to intervene the ADS and alerts the user to intervene the ADS of the ADV based on the generated safety alarm.

21 Claims, 9 Drawing Sheets

NEURAL NETWORK BASED SAFETY MONITORING SYSTEM FOR AUTONOMOUS VEHICLES

TECHNICAL FIELD

Embodiments of the present disclosure relate generally to operating autonomous vehicles. More particularly, embodiments of the disclosure relate to a neural network based safety monitoring system for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

For safety concerns, autonomous driving and driver assisted technologies require a safety monitoring system to alarm and/or alert a human driver to take over driving tasks for an ADV in potentially unsafe circumstances. An example of an unsafe circumstance arises when any critical subsystems of an autonomous driving system (ADS) of the ADV fail to generate a solution or an error in the ADS has occurred.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

A safety monitoring system for an ADV which runs in parallel with an autonomous driving system to provide safety alarms for a driver of the ADV is disclosed. The safety monitoring system can receive input data such as sensor data, vehicular status data, and/or map data for the ADV and determine if an alarm should activate using a machine learning model. The safety monitoring system can be self-improving as it can record a set of input data just prior to and/or subsequent to any alarm activations and/or user interventions/takeovers to later using as training data to improve the machine learning model.

According to one embodiment, a system receives sensor data from a number of sensors of the ADV. The system extracts a predetermined number of features from the sensor data using a machine learning model. The system determining whether to alert a user to intervene the ADS based on the extracted features using the machine learning model. The system then generating a safety alarm based on the determining whether to alert the user to intervene the ADS and alerts the user to intervene the ADS of the ADV based on the generated safety alarm.

Figure 1:
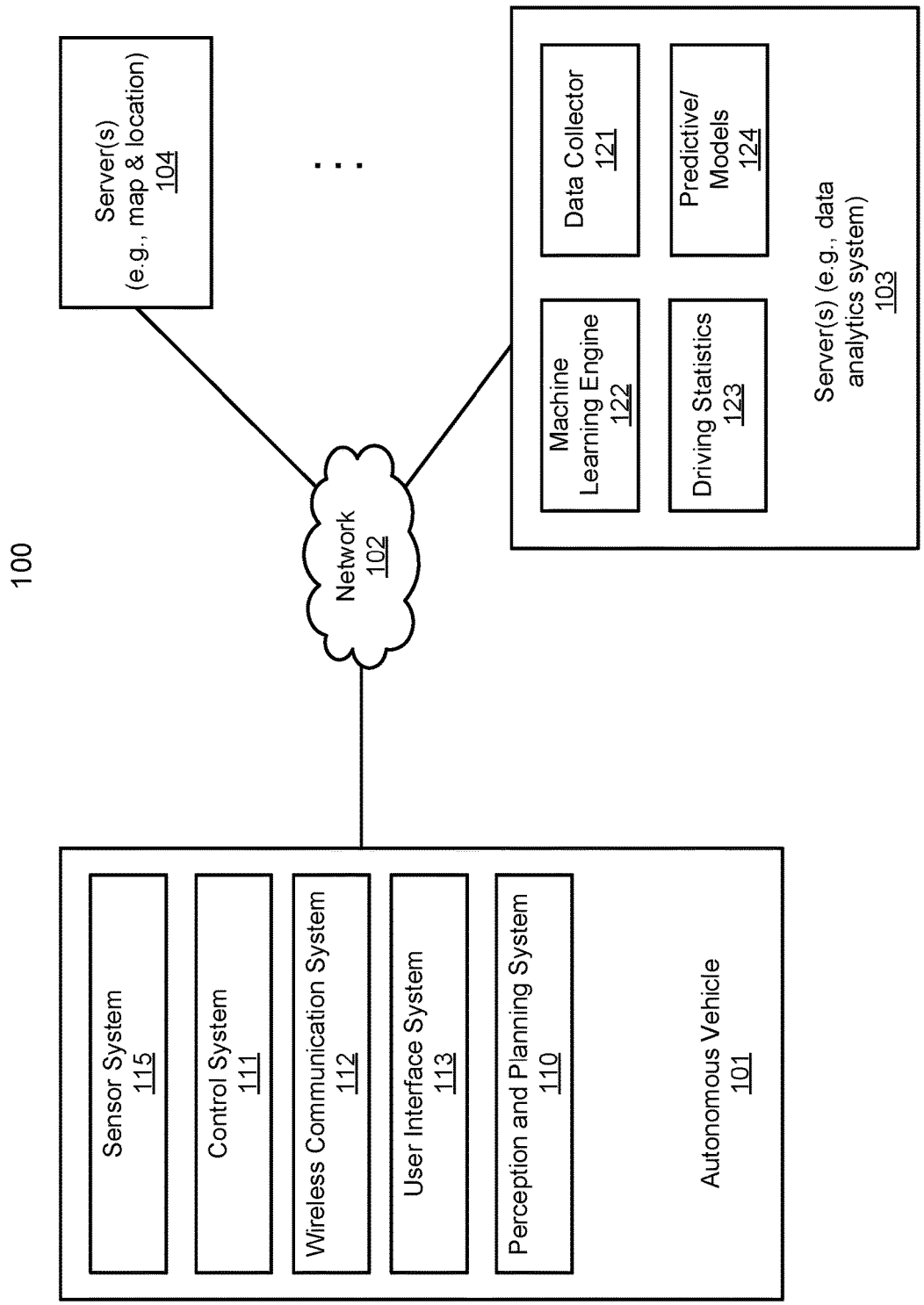
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
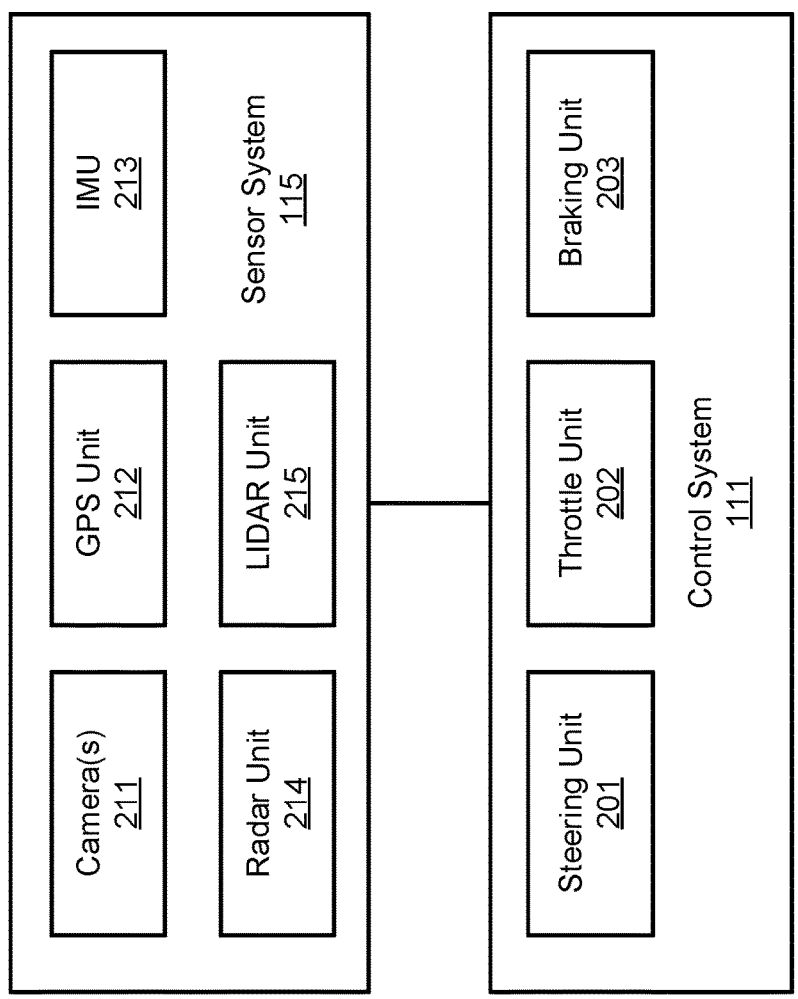
FIG. 2 is a block diagram illustrating an example of a sensor and control system using by an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics 123 can include sensor data and map data for ADVs just prior to or subsequent to safety interventions/driver takeovers of the ADVs.

Based on driving statistics 123, machine learning engine 122 generates or trains a set of rules, algorithms, and/or models 124 for a variety of purposes. In one embodiment, for example, algorithms/model 124 may include an algorithm/model to determine whether or not to activate a safety alarm for a driver to intervene an ADS of an ADV. The machine learning model can then be uploaded onto the ADVs to be used by the ADV in real-time. Note, models 124 may include, but is not limited to, neural networks (fully connected, partially connected, or a combination thereof), support vector machines (SVM), linear regression, k-nearest neighbors, naive bayes, k-means, and random forest models.

Figure 3A:
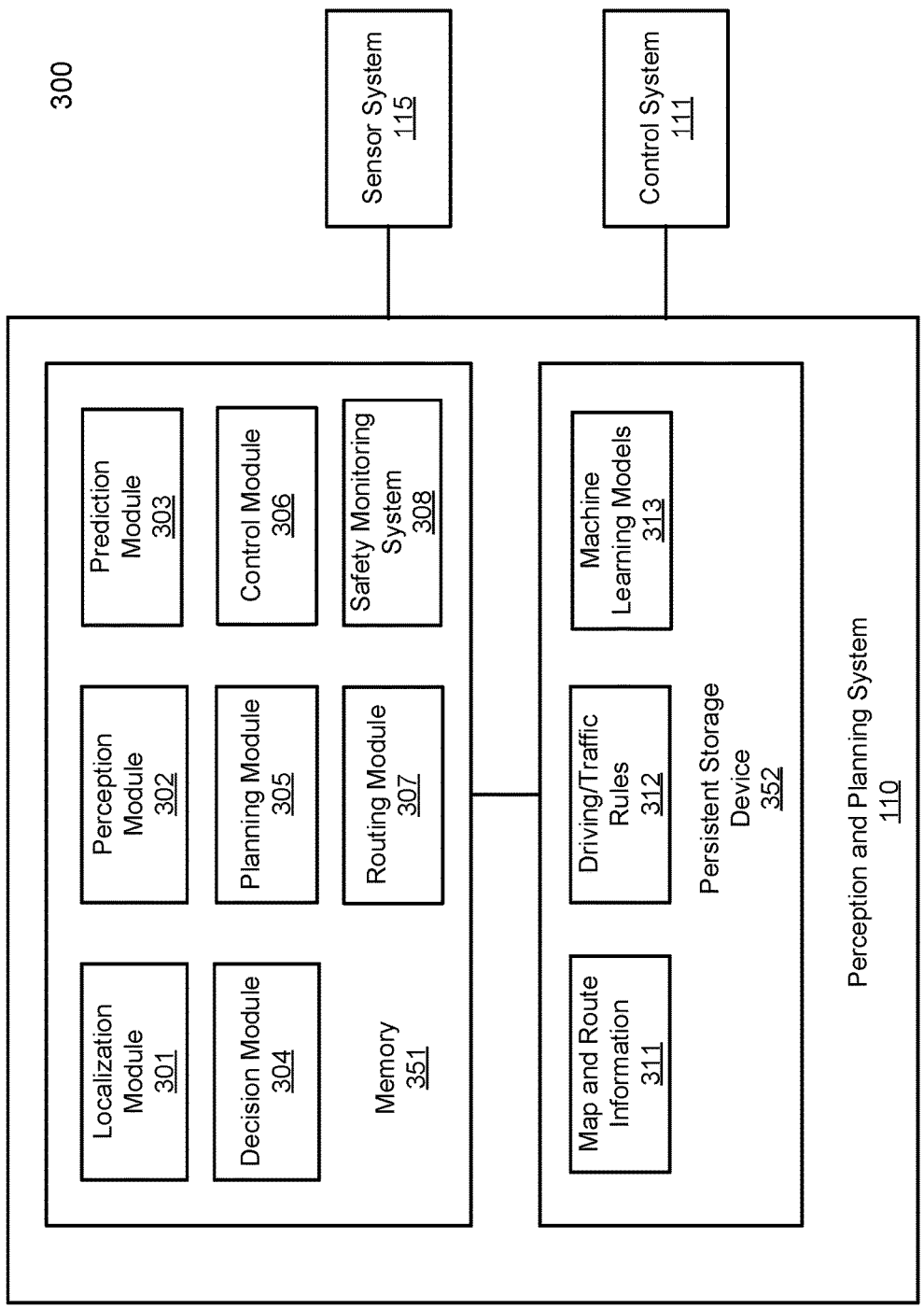
FIGS. 3A-3B are block diagrams illustrating examples of a perception and planning system used by an autonomous vehicle according to some embodiments.
Figure 3B:
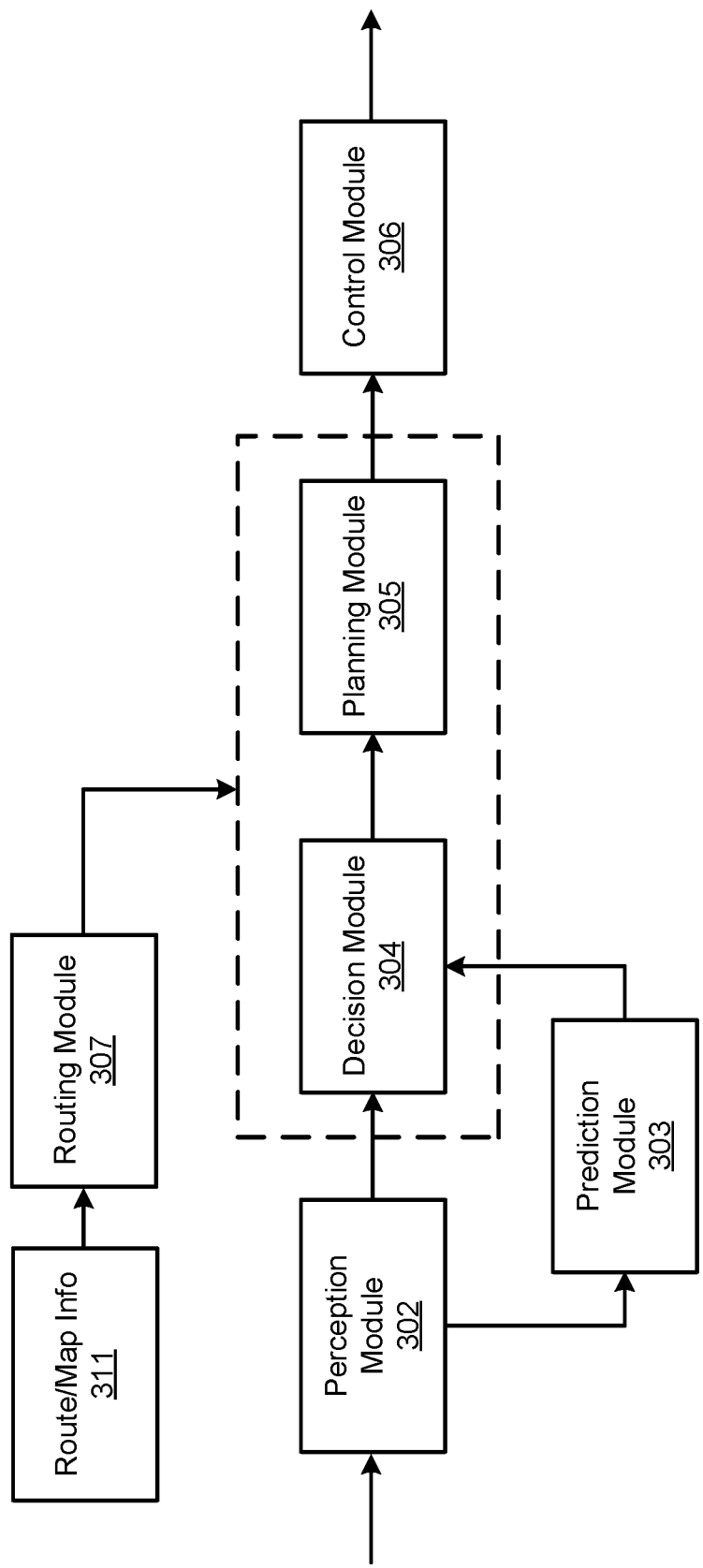

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and safety monitoring system 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
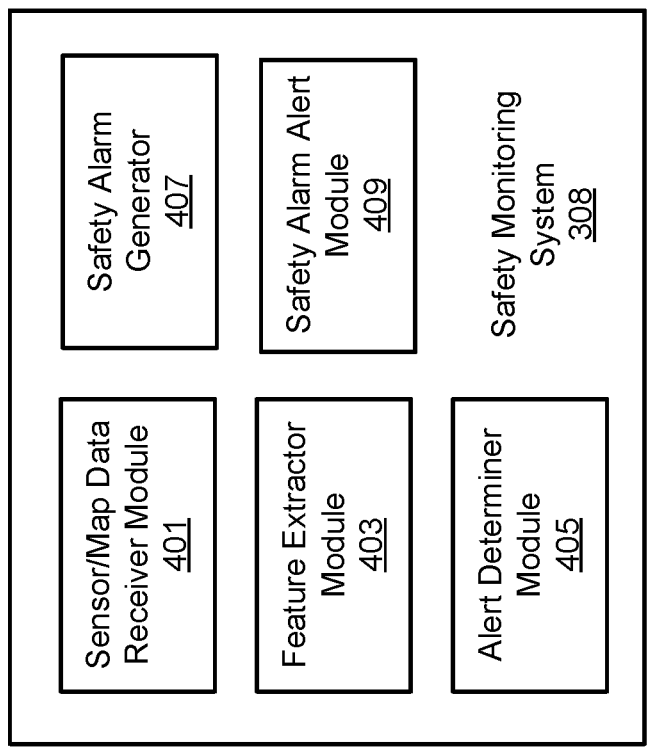
FIG. 4 is a block diagram illustrating an example of a safety monitoring system according to one embodiment.

FIG. 4 is a block diagram illustrating an example of a safety monitoring system according to one embodiment. Referring to FIG. 4, safety monitoring system 308 can monitor a number of sensor data, vehicular status data, and/or HD map data to determine whether or not to generate a safety alarm to alert a driver of the ADV to takeover the ADS of the ADV. Safety monitoring system 308 can include sensor/map data receiver module 401, feature extractor module 403, alert determiner module 405, safety alarm generator module 407, and safety alarm alert module 409. Sensor/map data receiver module 401 can monitor/receive a number of sensor/map data (e.g., LIDAR, RADAR, GPS, camera, IMU, HD map, etc.). Feature extractor module 403 can extract a number of features from the sensor/map data. Alert determiner module 405 can determine whether or not to generator a safety alarm alert. Safety alarm generator module 407 can generate the safety alarm alert and safety alarm alert module 409 can activate the safety alarm alert via sound, motion, vibration, and/or visual cues, to alert a driver of the ADV to take over the ADS of the ADV, e.g., to place their hands on the driving wheel and their foot on the gas or brake pedal.

Figure 5:
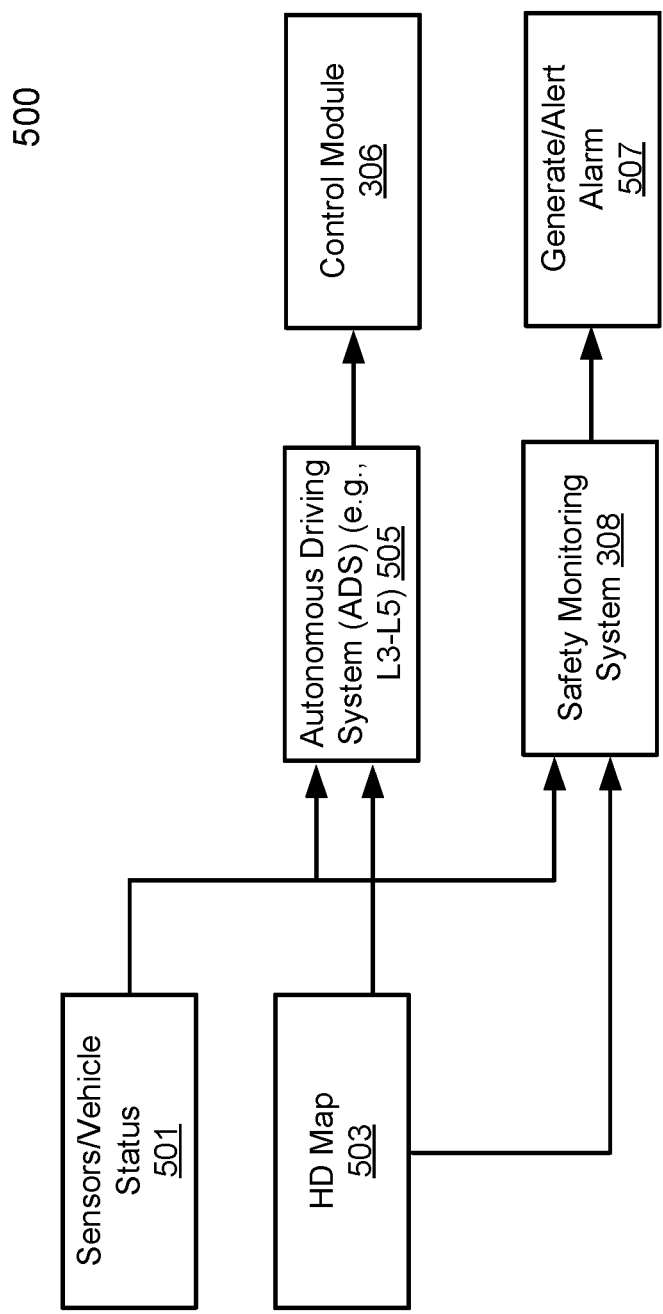
FIG. 5 is a block diagram illustrating an example of an ADV having an autonomous driving system and a safety monitoring system according to one embodiment.

FIG. 5 is a block diagram illustrating an example of an ADV having an autonomous driving system (ADS) and a safety monitoring system according to one embodiment. Referring to FIG. 5, in one embodiment, system 500 includes ADS 505 running in parallel with safety monitoring system 308. ADS 505 can include routing module 307, perception module 302, prediction module 303, and decision/planning modules 304-305 of FIG. 3B. Both ADS 505 and safety monitoring system 308 can be coupled to sensor/vehicle status 501 to receive sensor data and vehicle status for ADV 101. In one embodiment, both ADS 505 and safety monitoring system 308 can be coupled to HD map 503 (as part of map and route information 311 of FIG. 3A) to receive HD map data for the ADV. Based on sensor/vehicle status 501 and/or HD map data 503 (if available), ADS 505 generates a driving trajectory for the control module 306 to steer, accelerate, and/or brake for ADV 101. The sensor data/vehicle status 501 and/or HD map data 503 are simultaneously used by safety monitoring system 308 to extract a number of features from these data to determine whether alarm 507 should generate and alert a safety alarm.

Figure 6:
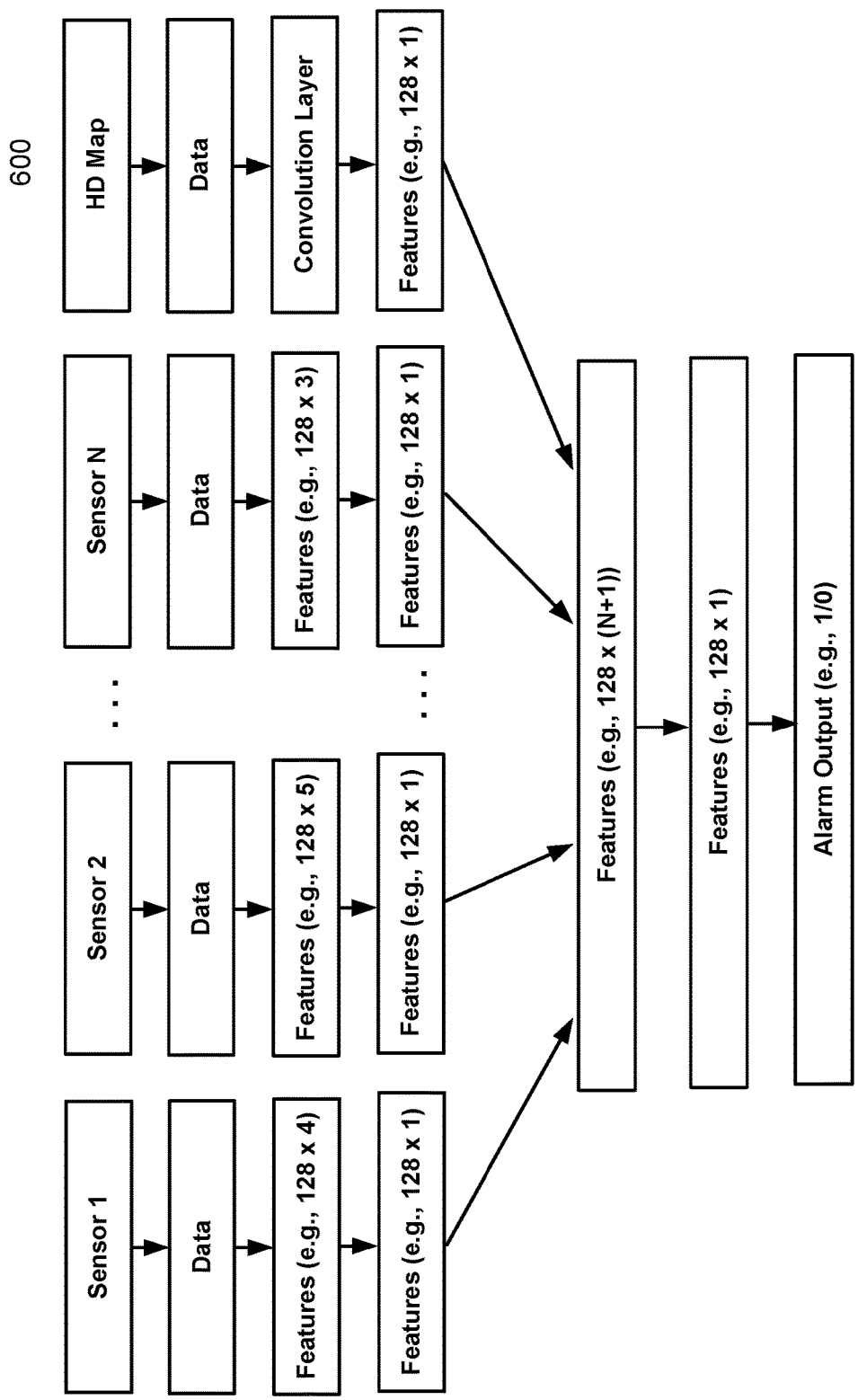
FIG. 6 is a block diagram illustrating an example of a neural network for a safety monitoring system according to one embodiment.

FIG. 6 is a block diagram illustrating an example of a neural network for a safety monitoring system according to one embodiment. Referring to FIG. 6, in one embodiment, neural network model 600 (e.g., a machine learning model for safety monitoring system 308) can detect an alarm condition based on input data (e.g., sensor, vehicle status, and/or HD map, etc.) seconds prior to an unsafe condition being detected by the ADS of the ADV. In one embodiment, network 600 is coupled to sensors 1, 2, . . . N. The sensors can be LIDAR, RADAR, camera, IMU, GPS, etc. Data inputs from each of the sensor can be fed into one or more fully connected layers. Note, a neural network is a machine learning model which can learn to perform tasks by considering examples (e.g., training with input/output scenarios), without being programmed with any task-specific rules. A neural network is a computational approach based on a large collection of neural units or neurons in a series of hidden layers or inner layers. Each hidden layer is made up of a set of neurons, where each neuron is connected to one or more neurons in the previous layer, and where neurons in a single layer can function completely independently and do not share any connections with other neurons of the layer. A neural network is self-learning and trained, rather than explicitly programmed. A fully connected layer is an inner layer having neurons with full connections to all neurons in the previous layer.

In one embodiment, two fully-connected layers are used for each of the sensor inputs. A first layer can have a dimension equal to (feature size×number of data inputs for the sensor). The first layer is then collapsed into a second layer with dimensions of feature size×1. The feature size can be predetermined, e.g., 64, 128, 256, 512, etc. based on a complexity of the respective sensor. For example, sensor 1 can be a LIDAR sensor with four input data points (e.g., x, y, z, reflection) and the first layer for sensor 1 can have a dimension of 128×4 (e.g., 128 features for each of the four data input points). The second layer for sensor 1 can then have a dimension of 128×1. In another example, sensor 2 can be an IMU sensor having five data input points (e.g., x, y, z, velocity, acceleration). In this case, the first layer for sensor 2 can have a dimension of 128×5, (e.g., 128 features for each of the 5 data inputs) and a second layer for sensor 2 can have a dimension of 128×1. In another example, sensor N can be a camera sensor which may correspond to a first layer having a dimension of 128×3 (e.g., 128 pixels, and the three color channels: Red, Green, and Blue as input data points) and a second layer having a dimension of 128×1.

In one embodiment, network 600 includes a map data input. The map data input can be a rectangular map input (e.g., (x1, y1), (x2, y2), (x3, y3), (x4, y4)) having a number of map pixels for the rectangle and each map pixel can include indicator values such as: road, boundary, intersection, and direction for the map pixel. For example, indicator values for a map pixel can be (1, 0, 0, −30 degrees) which could indicate that the map pixel is part of a road, not a boundary, not an intersection, and the road is heading in the direction of −30 degrees from a horizontal x-axis (e.g., Eastbound). In one embodiment, the neural network layer for HD map data can be a partially connected layer, e.g., a convolution/deconvolutional layer. Note, a partially connected layer is an inner layer having neurons with partial connections to all neurons in the previous layer. A convolutional/deconvolutional layer has each neuron connected only to a local region in the previous layer spatially, but to the full depth (i.e. all color channels for an image).

Next, the output layers from the N sensors and/or HD map are collapsed into a 128 by (N+1) layer. The 128×(N+1) layer is subsequently collapsed into a 128×1 layer and into an output (e.g., 1/0) which can be an indicator for whether or not to activate a safety alarm. Although two fully connected layers with 128 features are shown for each sensor, any combination of layers and/or features is possible.

Network 600 of the safety monitoring system can be used online simultaneous alongside the ADS. "Online" activities refer to activities ADVs perform in real-time to detect or classify an object. "Offline" activities refer to activities a server or an ADV performs in preparation for object detection or classification. In one embodiment, either the ADS or the safety monitoring system can activate a safety alarm. In one embodiment, when the driver intervenes, the safety monitoring system can also record the input data from sensors and/or HD map at that instance in time, or just prior to, or subsequent to the driver intervention. The recording can be used later to train and to improve network 600. In one embodiment, recordings can be uploaded to a remote server such as server 103. Server 103 can then train offline network 600 based on recordings collected from ADVs on the road.

Figure 7:
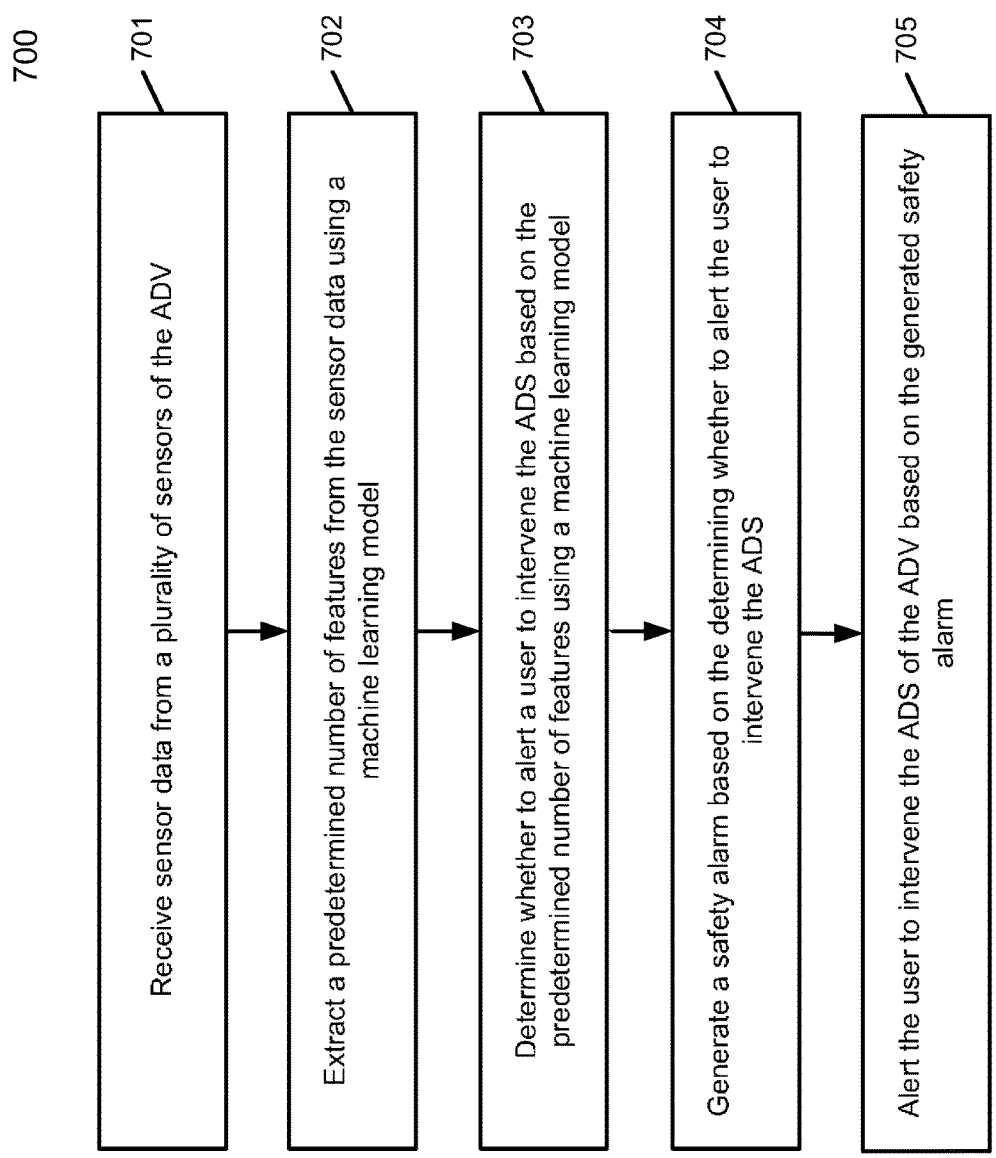
FIG. 7 is a flow diagram illustrating a method according to one embodiment.

FIG. 7 is a flow diagram illustrating a method according to one embodiment. Processing 700 may be performed by processing logic which may include software, hardware, or a combination thereof. For example, process 700 may be performed by lane boundary module 308 of FIG. 3A. Referring to FIG. 7, at block 701, processing logic receives sensor data from a number of sensors of the ADV. At block 702, processing logic extracts a predetermined number of features from the sensor data using a machine learning model. At block 703, processing logic determines whether to alert a user to intervene the ADS based on the extracted features using the machine learning model. At block 704, processing logic generates a safety alarm based on the determining whether to alert the user to intervene the ADS. At block 705, processing logic alerts the user to intervene the ADS of the ADV based on the generated safety alarm.

In one embodiment, processing logic further receives map data and determines whether to alert the user to intervene the ADS based on both the sensor and the map data using the machine learning model. In another embodiment, the machine learning model includes a neural network model and the neural network model is to extract the predetermined number of features. In another embodiment, the neural network model includes fully connected layers for the sensor data corresponding to each of the plurality of sensors. In another embodiment, the neural network model includes a partially connected layer for the map data. In another embodiment, the partially connected layer is a convolutional layer.

In one embodiment, the number of sensors includes a range detection sensor, an image-capturing sensor, and an inertial measurement unit (IMU) sensor. In another embodiment, the range detection sensor comprises a light detection ranging (LIDAR) sensor or a radio detection and ranging (RADAR) sensor. In one embodiment, processing logic further records sensor data corresponding to a user intervention by the ADS, and schedules the machine learning model to be trained based on the recording.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
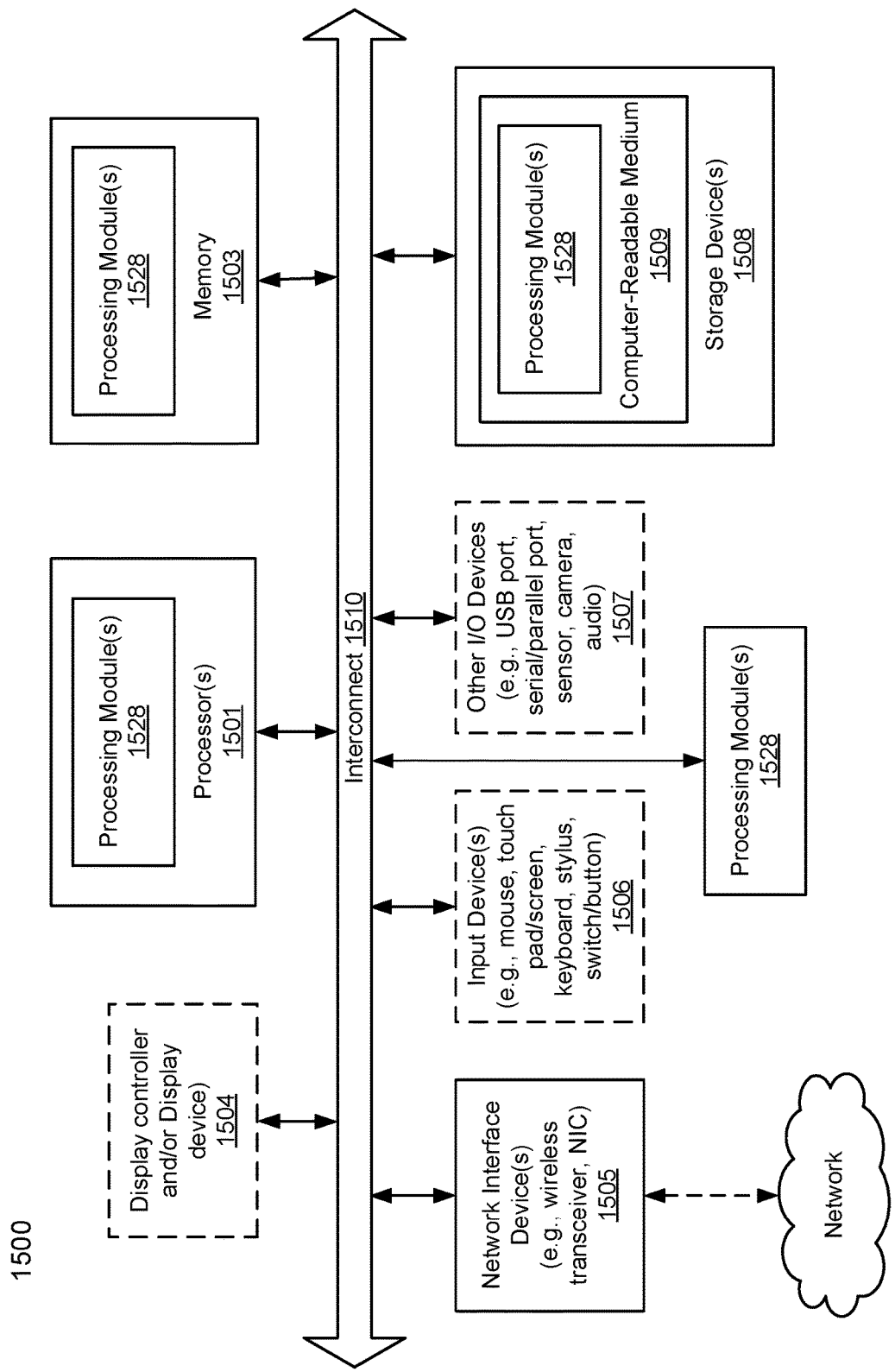
FIG. 8 is a block diagram illustrating a data processing system according to one embodiment.

FIG. 8 is a block diagram illustrating an example of a data processing system which may be used with one embodiment of the disclosure. For example, system 1500 may represent any of data processing systems described above performing any of the processes or methods described above, such as, for example, perception and planning system 110 or servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, safety monitoring system 308 of FIG. 3A. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to alert a user to intervene an autonomous driving system (ADS) of an autonomous driving vehicle (ADV), the method comprising:
receiving sensor data from a plurality of sensors of the ADV;
extracting a predetermined number of features from the sensor data using a machine learning model;
determining whether to alert a user to intervene the ADS based on the extracted features using the machine learning model;

generating a safety alarm based on the determining whether to alert the user to intervene the ADS; and alerting the user to intervene the ADS of the ADV based on the generated safety alarm.

2. The method of claim 1, further comprising:

receiving map data for the ADV; and determining whether to alert the user to intervene the ADS based on both the sensor and the map data using the machine learning model.

3. The method of claim 2, wherein the machine learning model includes a neural network model and the neural network model is to extract the predetermined number of features.

4. The method of claim 3, wherein the neural network model includes fully connected layers for the sensor data corresponding to each of the plurality of sensors.

5. The method of claim 4, wherein the neural network model includes a partially connected layer for the map data.

6. The method of claim 5, wherein the partially connected layer is a convolutional layer.

7. The method of claim 1, wherein the plurality of sensors includes a range detection sensor, an image-capturing sensor, and an inertial measurement unit (IMU) sensor.

8. The method of claim 7, wherein the range detection sensor comprises a light detection ranging (LIDAR) sensor or a radio detection and ranging (RADAR) sensor.

9. The method of claim 1, further comprising:

recording sensor data corresponding to a user intervention by the ADS; and scheduling the machine learning model to be trained based on the recording.

10. A non-transitory machine-readable medium having instructions stored therein, which when executed by a processor, cause the processor to perform operations, the operations comprising:

receiving sensor data from a plurality of sensors of an autonomous driving vehicle (ADV);

extracting a predetermined number of features from the sensor data using a machine learning model;

determining whether to alert a user to intervene an autonomous driving system (ADS) of the ADV based on the extracted features using the machine learning model;

generating a safety alarm based on the determining whether to alert the user to intervene the ADS; and alerting the user to intervene the ADS of the ADV based on the generated safety alarm.

11. The non-transitory machine-readable medium of claim 10, further comprising:

receiving map data for the ADV; and determining whether to alert the user to intervene the ADS based on both the sensor and the map data using the machine learning model.

12. The non-transitory machine-readable medium of claim 11, wherein the machine learning model includes a neural network model and the neural network model is to extract the predetermined number of features.

13. The non-transitory machine-readable medium of claim 12, wherein the neural network model includes fully connected layers for the sensor data corresponding to each of the plurality of sensors.

14. The non-transitory machine-readable medium of claim 13, wherein the neural network model includes a partially connected layer for the map data.

15. The non-transitory machine-readable medium of claim 14, wherein the partially connected layer is a convolutional layer.

16. A data processing system, comprising: a processor; and a memory coupled to the processor to store instructions, which when executed by the processor, cause the processor to perform operations, the operations including:

receiving sensor data from a plurality of sensors of an autonomous driving vehicle (ADV);

extracting a predetermined number of features from the sensor data using a machine learning model;

determining whether to alert a user to intervene an autonomous driving system (ADS) of the ADV based on the extracted features using the machine learning model;

generating a safety alarm based on the determining whether to alert the user to intervene the ADS; and alerting the user to intervene the ADS of the ADV based on the generated safety alarm.

17. The system of claim 16, further comprising:

receiving map data for the ADV; and determining whether to alert the user to intervene the ADS based on both the sensor and the map data using the machine learning model.

18. The system of claim 17, wherein the machine learning model includes a neural network model and the neural network model is to extract the predetermined number of features.

19. The system of claim 18, wherein the neural network model includes fully connected layers for the sensor data corresponding to each of the plurality of sensors.

20. The system of claim 19, wherein the neural network model includes a partially connected layer for the map data.

21. The system of claim 20, wherein the partially connected layer is a convolutional layer.

* * * * *